June 16, 1942. C. N. LOHREY Re. 22,118

POROUS METALLIC TYPE

Original Filed July 9, 1938

Carl N. Lohrey
Inventor

By Pearl Benst
His Attorney

Reissued June 16, 1942

Re. 22,118

UNITED STATES PATENT OFFICE 22,118

POROUS METALLIC TYPE

Carl N. Lohrey, Dayton, Ohio, assignor to The National Cash Register Company, Dayton, Ohio, a corporation of Maryland Original No. 2,199,265, dated April 30, 1940, Serial No. 218,377, July 9, 1938. Application for reissue June 19, 1940, Serial No. 341,397

13 Claims. (Cl. 101—368)

This invention relates to printing members and more particularly to impregnated printing members of porous metallic structure.

The principal object of this invention is to provide type, type-wheels and other printing members of porous metallic structure wettable by and capable of absorbing a relatively large amount of liquid substance, such as ink or sensitizing fluids, which is available for rendering a great number of inked or sensitized impressions without replenishment of the supply.

Another object of the invention is to provide an ink absorbing metallic printing member of highly porous construction molded of powdered metals and a subliming substance which is removed in a sintering operation.

Another object of the invention is to provide a metallic printing member of porous construction impregnated with absorbed ink, whereby the ink which has been transferred from the pores on the type face to the material receiving the impression, on the last printing operation, is replaced from the absorbed ink supply by capillary diffusion.

Another object of the invention is to provide a metallic printing member of ink porous construction possessing the qualities of hardness, rigidity, and malleability.

Another object of the invention is to provide a porous metallic conductor of ink having a porous printing face integral therewith, said pores being invisible to the unaided eye.

Another object of the invention is to provide an ink impregnated metallic type member of porous structure which is kept evenly saturated from a self-contained ink supply, by capillary diffusion.

Another object of the invention is to provide a porous metallic type wheel having a self-enclosed ink well, said ink being conducted to the type face by interconnecting capillary pores.

Another object of the invention is to provide type of porous metallic structure, that may be inked from inside the type face.

Another object of the invention is to provide a metallic type that will absorb and hold a supply of ink sufficient for a great number of impressions, which ink may be replaced by absorption when exhausted.

With these and incidental objects in view, the invention includes certain novel features of construction and combinations of parts, the essential elements of which are set forth in appended claims and a preferred form or embodiment of which is hereinafter described with reference to the drawing which accompanies and forms a part of this specification:

Figure 1:
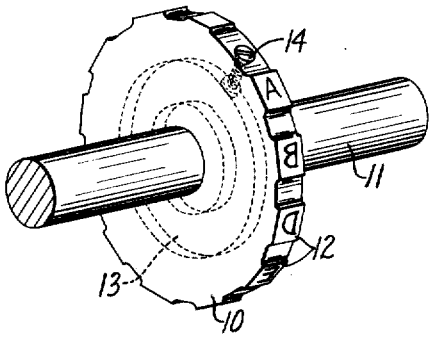
Fig. 1 is a perspective view of a typical type wheel having a well for fluids enclosed therein.

The application of ink to the printing face of metallic type has heretofore required contact of the type with an inking surface after every impression, because all of the ink or nearly all of the ink on the type face is transferred to the printed material when the impression is made. Methods have been devised to overcome the necessity of inking such type on each inked impression among which are the use of an inked ribbon or a sheet of carbon paper interposed between the type and the record material. In such methods using an interposed inking substance, the impression is faulty due to the thickness of the material so placed between the type and the material to be printed upon.

This invention provides a method of supplying ink to type faces from an ink supply contained in the pores of or conducted through pores of the body of the type, making it unnecessary to ink the type faces on each printing operation or to have an intervening ink carrying material between the type and the record material. The ink removed from the printing face is constantly replaced from within the type member by a capillary duffusing action.

The material used in the preferred embodiment of applicant's invention is composed of metal of a hardness comparable to that ordinarily used for metal type but having therein interconnecting capillary pores capable of absorbing and conducting fluids in all directions. The absorbed fluids are retained in the body pores of the type by capillary action, except that the surface film may be transferred to material used in printing by an ordinary printing operation. The ink removed from the pores opening on the type face is then restored by capillary action which tends constantly to diffuse the absorbed fluid evenly throughout the type body.

The method of manufacturing porous metallic structures is well known, the metals used having different characteristics of hardness to resist wear and also corrosive action of the fluid used, porosity, and differing as to the wetting action of fluids. The particular method outlined hereinafter as the preferred form of the invention uses metals which produce a hard porous structure, wet by, and, being porous, adapted to absorb dye inks. The following method of manufacture is typical but neither the materials nor the method of manufacture is to be regarded as the only method of producing porous metallic type, as the porosity, the hardness of the metal, and its action to wetting must suit the fluid to be used.

*Manufacture of porous metallic type suitable for absorbing ink*

A porous metallic structure composed of 70% powdered nickel and 30% powdered copper, being the approximate analysis of Monel metal, has been found most suitable for use with dye inks as it is wettable by such fluids, absorbs a considerable quantity of them, and is hard enough to resist wear through use of corrosion.

A mixture of powdered copper and powdered nickel in the proportions stated is molded under great pressure in molds formed so that the type members produced have impressed thereon the characters desired. The type members so molded may be further treated by sintering in an inert gas to perfect the union of the adjacent granules of metal by heat. There will be left throughout the molded and sintered product a multitude of interconnecting pores capable of absorbing dye ink from the surface. To render the molded structure even more porous, some material that sublimates in the presence of heat may be added in the form of powder, to the powdered copper and powdered nickel so that when the sintering operation is completed the space formerly occupied by the sublimed material serves as additional pore space for the storage of ink. The molded product may be struck by a forming tool to shape it without destroying its porosity.

The pores so produced extend to the surface of the molded product and consequently the fluid at the open ends of the said pores are subject to ordinary surface tension phenomena. The result is that the fluids absorbed by the molded product will not be dissipated unless the surface film is broken by a printing impression, in which event a portion of the surface film will be transferred to the article to be printed. This removed surface film is restored at once by the diffusion of the ink contained in the pores, due to capillary action.

The pores so formed are so small as to be invisible to the unaided eye. The small size of the pores allows only a small portion of ink to be transferred on a printing operation, eliminating any possibility of smudging or blotting. The capillary forces in such small pores are so great as to hold the fluid in the pores against gravitational force, and the moving forces caused by rotation or hammering normal to printing operations.

*Means of supplying type members with fluids*

Figure 2:
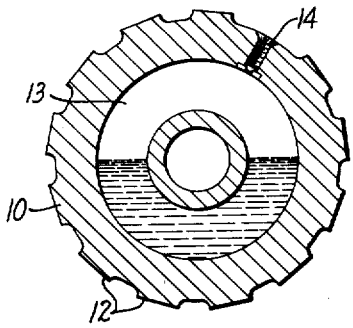
Fig. 2 is a cross-section through the wheel shown in Fig. 1, perpendicular to its axis of rotation.

The wheel form of embodiment of the invention is illustrated in Figs. 1 and 2 which represent a porous metallic type wheel 10 mounted on a shaft 11 having a plurality of type faces 12 on its circumference. Within the body of the wheel is an annular font 13 adapted to hold fluids as shown in Fig. 2. A plug 14 is provided giving access to the font from the circumference of the wheel for filling with fluid. In this particular form the fluids saturate the porous printing wheel by contact therewith. Capillary forces acting on the surface film formed at the external pore openings keep the fluid within the wheel, except when the surface film is broken by contact with the material to be printed.

Figure 3:
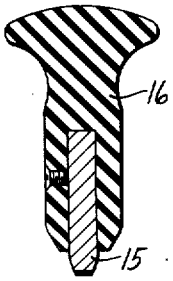
Fig. 3 is a vertical cross-section through a printing member mounted in a handle.

A modified form of embodiment of the invention is shown in Fig. 3 which consists of a large bodied porous metallic printing member 15 having a correspondingly great capacity for absorbing and storing ink in its pores when saturated. A removable handle 16 is provided to protect the hands of the user from contact with the printing member. With this construction the member 15 is used repeatedly until exhausted of fluid and then is resaturated.

Figure 4:
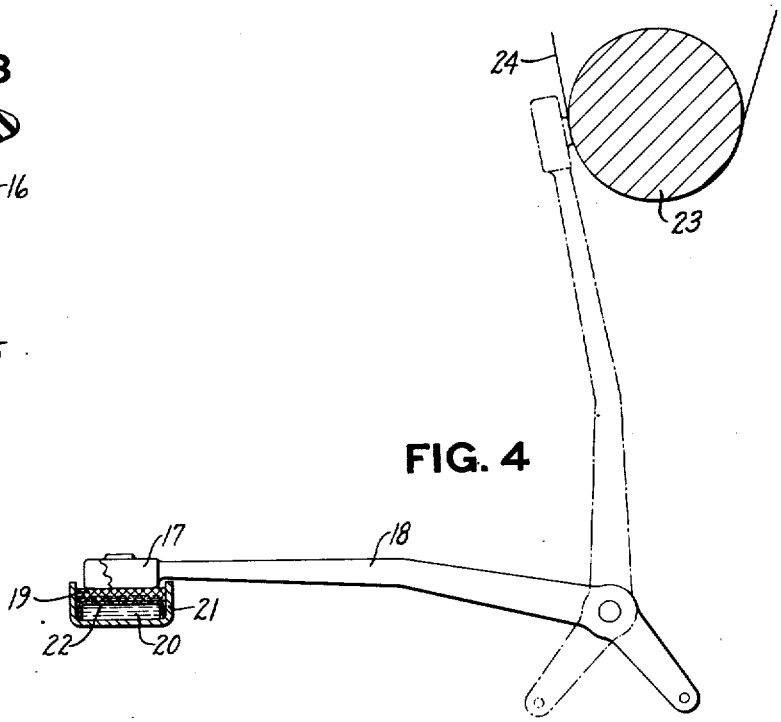
Fig. 4 represents the type levers, type basket and platen of a typical typewriter, showing a wick method of saturating porous type.

Another desirable embodiment is shown in Fig. 4 wherein the porous metallic type 17 is fastened to the type levers 18 of a typical typewriter. Normally the body of the type 17 rests on a wick 19 which is half submerged in fluid 20 held in a reservoir 21. The reservoir and wick take the place of the usual type basket. The wick 19 is saturated with the fluid and whatever fluid is removed from the type body by the type face in the printing operation is replenished by the wick as the type rests thereon. A screen support 22 maintains the wick in a partially submerged condition to prevent splashing. A platen 23 is illustrated as holding record material 24 in the usual manner. In this construction the same wick can serve a plurality of printing members.

The ink used with porous type should preferably be non-volatile and free from pigment, or corrosive action on the pores, to prevent clogging.

It is to be understood that applicant is not confining his invention to the particular combination of metals named nor their use solely with the fluids mentioned, although the metals mentioned have been found particularly suited to be used with dye inks.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. The method of making porous printing type consisting of mixing seven parts of powdered nickel and three parts of powdered copper; and molding the mixture under great pressure until a rigid structure is formed.

2. As a new article of manufacture, a product produced in accordance with the method of claim 1.

3. The method of making porous printing type consisting of mixing seven parts of powdered nickel and three parts of powdered copper; molding the mixture under great pressure until a rigid body is formed; and sintering the molded body in an inert gas.

4. As a new article of manufacture, a product produced in accordance with the method of claim 3.

5. The method of making porous printing type consisting of mixing seven parts of powdered nickel, three parts of powdered copper, and a powdered subliming material; molding the mixture under great pressure; and sintering the molded body in an inert gas to perfect the union of the constituent metal particles and to vaporize and expel the subliming material.

6. As a new article of manufacture, a product produced in accordance with the method of claim 5.

7. The method of producing a printing member which consists in the steps of forming the member by joining powdered metal into a single porous mass and then impregnating said mass with a non-corrosive recording fluid.

8. The method of producing a printing member which consists in joining powdered metal, which is wettable by but not corroded by ink, into a rigid porous mass; next sintering said mass in an inert gas to perfect the union of the powdered metal; and then impregnating the porous mass with an ink of a type which will not clog the pores of the metal.

9. A printing member of joined powdered metal forming a single continuous porous malleable body containing a network of interconnecting pores extending in all directions between the joined particles of metal and capable of conducting and retaining ink to be used in a printing operation.

10. A printing member of closely united powdered metal forming a rigid porous body, said member having thereon indicia from which impressions are made, said pores in said body holding a supply of ink and said pores extending through the body in all directions from said indicia and operating to conduct ink quickly by capillary action from adjacent parts of said body to said indicia to restore uniform ink density in the body after ink has been removed from the indicia when an impression has been made.

11. The method of producing a printing member which consists in molding powdered metal under pressure to form a rigid mass having pores extending therethrough in all directions between the particles of powdered metal; next, fusing the rigid mass of powdered metal to form an alloy which retains the pores that were formed when the powdered metal was molded; and then impregnating said member with an ink of a type which will not clog the pores in the metal.

12. As a new article of manufacture, a product produced in accordance with the method of claim 11.

13. As a new article of manufacture, a product produced in accordance with the method of claim 8.

CARL N. LOHREY.